(12) United States Patent
Lewis et al.

(10) Patent No.: US 11,550,451 B2
(45) Date of Patent: *Jan. 10, 2023

(54) SYSTEMS AND METHODS FOR PROVIDING AND UPDATING LIVE-STREAMING ONLINE CONTENT IN AN INTERACTIVE WEB PLATFORM

(71) Applicant: VERIZON PATENT AND LICENSING INC., Basking Ridge, NJ (US)

(72) Inventors: Gabriel A. Lewis, Los Angeles, CA (US); Roy Sekoff, Los Angeles, CA (US); Mitchell R. Semel, Sleepy Hollow, NY (US); Kim-Leigh Pontin, London (GB); Adam B. Denenberg, Rockville Centre, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/226,300

(22) Filed: Dec. 19, 2018

(65) Prior Publication Data

US 2019/0121510 A1 Apr. 25, 2019

Related U.S. Application Data

(63) Continuation of application No. 13/735,927, filed on Jan. 7, 2013, now Pat. No. 10,198,152.
(Continued)

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *H04N 21/2187* (2013.01);
(Continued)

(58) Field of Classification Search
CPC ......... H04N 21/2187; H04N 21/26258; H04N 21/4316; H04N 21/4782; H04N 21/6125;
(Continued)

(56) References Cited

U.S. PATENT DOCUMENTS 7,599,918 B2 10/2009 Shen et al.
8,132,202 B2 3/2012 Swix et al.
(Continued)

FOREIGN PATENT DOCUMENTS

WO  WO 01/47262 A2  6/2001
WO  WO 01/91458 A2  11/2001
WO  WO 2010/044764 A1  4/2010

OTHER PUBLICATIONS

International Search Report and Written Opinion, issued for PCT/US2013/020782, dated Apr. 4, 2013 (14 pages).

*Primary Examiner* — Tuyetlien T Tran

(57) ABSTRACT

Systems and methods are disclosed for providing live-streaming online content, including video segments married with related online information in a single online platform. In accordance with one implementation, a method is provided that includes generating, using at least one processor, a series of videos having a sequential order to display in a web browser and publishing the videos in the web browser. The method further includes determining online data that relates to each video in the series and displaying the related data in the web browser. Further, the method includes playing the videos in the web browser in a sequential order and updating the data that relates to a video while the video is playing in real-time. The related data may include user
(Continued)

comments, social media comments, pictures, videos, webpages, or hyperlinks.

20 Claims, 6 Drawing Sheets

Related U.S. Application Data

(60) Provisional application No. 61/682,190, filed on Aug. 10, 2012.

(51) Int. Cl.

| | | |
|---|---|---|
| *H04N 21/2187* | (2011.01) | |
| *H04N 21/262* | (2011.01) | |
| *H04N 21/431* | (2011.01) | |
| *H04N 21/4782* | (2011.01) | |
| *H04N 21/61* | (2011.01) | |
| *G06F 3/04847* | (2022.01) | |
| *G06F 3/0481* | (2022.01) | |
| *G06F 3/04842* | (2022.01) | |

(52) U.S. Cl.
CPC ... *H04N 21/26258* (2013.01); *H04N 21/4316* (2013.01); *H04N 21/4782* (2013.01); *H04N 21/6125* (2013.01); *G06F 3/0481* (2013.01); *G06F 3/04842* (2013.01); *G06F 3/04847* (2013.01)

(58) Field of Classification Search
CPC .. G06F 3/0482; G06F 3/04842; G06F 3/0484; G06F 3/04847; G06F 3/0481
See application file for complete search history.

(56) References Cited

U.S. PATENT DOCUMENTS

| | | | |
|---|---|---|---|
| 9,266,017 B1* | 2/2016 | Parker | H04N 21/2187 |
| 2001/0002469 A1 | 5/2001 | Bates et al. | |
| 2002/0026496 A1 | 2/2002 | Boyer et al. | |
| 2003/0093790 A1* | 5/2003 | Logan | G10H 1/0033 |
| | | | 725/38 |
| 2003/0182366 A1 | 9/2003 | Geshwind | |
| 2004/0165006 A1 | 8/2004 | Kirby et al. | |
| 2004/0267730 A1 | 12/2004 | Dumais | |
| 2005/0132420 A1* | 6/2005 | Howard | G10L 15/24 |
| | | | 725/135 |
| 2006/0129458 A1* | 6/2006 | Maggio | G06Q 30/02 |
| | | | 705/14.2 |
| 2007/0245391 A1 | 10/2007 | Pont | |
| 2008/0276269 A1* | 11/2008 | Miller | H04N 21/47202 |
| | | | 725/34 |
| 2012/0108293 A1 | 5/2012 | Law et al. | |
| 2012/0163770 A1* | 6/2012 | Kaiser | H04N 21/44016 |
| | | | 386/241 |
| 2012/0317046 A1* | 12/2012 | Myslinski | G06Q 30/02 |
| | | | 705/329 |
| 2013/0066719 A1* | 3/2013 | Kast | G06Q 30/02 |
| | | | 705/14.53 |
| 2013/0332960 A1* | 12/2013 | Young | G06F 3/017 |
| | | | 725/41 |
| 2014/0012910 A1* | 1/2014 | White | H04N 21/4355 |
| | | | 709/204 |

* cited by examiner

SYSTEMS AND METHODS FOR PROVIDING AND UPDATING LIVE-STREAMING ONLINE CONTENT IN AN INTERACTIVE WEB PLATFORM

CROSS-REFERENCE TO RELATED APPLICATION(S)

This application is a continuation application of under 37 CFR § 1.53(b) of and claims the benefit of priority to pending prior U.S. Nonprovisional patent application Ser. No. 13/735,927, filed Jan. 7, 2013 and claims the benefit of priority to U.S. Provisional Patent Application No. 61/682,190, filed Aug. 10, 2012, all of which are expressly incorporated herein by reference in their entireties.

TECHNICAL FIELD

The present disclosure relates generally to systems and methods for providing live-streaming content. More particularly, and without limitation, the present disclosure relates to systems and methods for providing and dynamically updating a live-streaming and interactive platform of video, social media, and/or web content presented using, for example, a web browser or application device.

BACKGROUND

Today, various forms of content can be made available online, such as videos, pictures, websites, and social media tools. Each form of content can be used to communicate about specific, but related, information, such as a particular newsworthy story. For example, online content providers, like Huffington Post, may broadcast a video of a particular story on its webpage. In addition, a local magazine may publish an article related to that story on the magazine's webpage. An individual user may then use social media, such as Twitter, Facebook, or Google+, to provide input or feedback relating to that story. Also, users may post comments to either the video, the article, or the social media post, using interactive features available in each medium, respectively, such as a comments forum.

Prior techniques displayed each form of online content in separate mediums, e.g., separate websites. For example, if a user watched a video on one webpage, but was interested in news articles relating to the video, he would have to search for those stories in a new browser window or link out to a new webpage, thereby migrating away from his original webpage, which disrupts his browsing experience.

Additionally, the increased use of the Internet has resulted in a greater use of web browsing instead of television to read and/or receive newsworthy content. While users may prefer the experience of watching live television coverage, they cannot obtain related online content from watching a television program because traditional television programming is not interactive and does not integrate online content. Moreover, current televisions cannot update the currently airing content with relevant online content that is part of the global web discussion of the topic at hand.

Thus, there exists a need to provide live-streaming video content in an online platform that adds dynamic, related online content to the video content, allowing users to more easily view and access online content as it changes in real-time. There also exists a need to allow users to receive different forms of online content in one medium without interrupting their browsing experience.

SUMMARY

The present disclosure provides improved systems and methods for providing live-streaming online content in a single platform of a web browser or application device. Moreover, the present disclosure includes systems and methods for playing a video and dynamically updating online content related to the video in a single platform while the video is playing.

In accordance with some embodiments, improved techniques are provided for generating a series of videos to display in a web browser in a sequential order.

In accordance with additional embodiments, systems and methods are provided for determining online content that relates to the videos, for displaying in the web browser while the videos are playing.

In accordance with still further embodiments of the present disclosure, systems and methods are provided for dynamically updating the related online content concurrently with the transmission or broadcast of a video In accordance with one disclosed exemplary embodiment, a method is provided for providing live-streaming online content. According to the method, the method may include generating, using at least one processor, a series of videos to display in a browser, the series of videos having a sequential order. A preview of the series of videos may be published in the browser. The method may determine data related to each video, using the processor. The related data may be displayed in the browser, and the series of videos may be played in the browser in the sequential order.

In accordance with another disclosed exemplary embodiment, a system is provided for providing live-streaming online content. The system may include a processor and a memory storing instructions which, when executed by the processor, cause the system to generate a series of videos to display in a browser, the series of videos having a sequential order. A preview of the series of videos may be published in the browser. The system may determine data related to each video. The related data may be displayed in the browser, and the series of videos may be played in the browser in the sequential order.

In accordance with another disclosed exemplary embodiment, a computer-implemented method is provided for providing live-streaming online content. According to the method, the method may include generating, using at least one processor, a series of videos to display in a browser, the series of videos having a sequential order. A preview of the series of videos may be published in the browser. The method may determine data related to each video, using the processor. The related data may be displayed in the browser, and the series of videos may be played in the browser in the sequential order.

BRIEF DESCRIPTION OF THE DRAWINGS

The accompanying drawings, which are incorporated in and constitute a part of this specification, illustrate several embodiments of the present disclosure and together with the description, serve to explain the principles of the disclosed embodiments.

DETAILED DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

Figure 1:
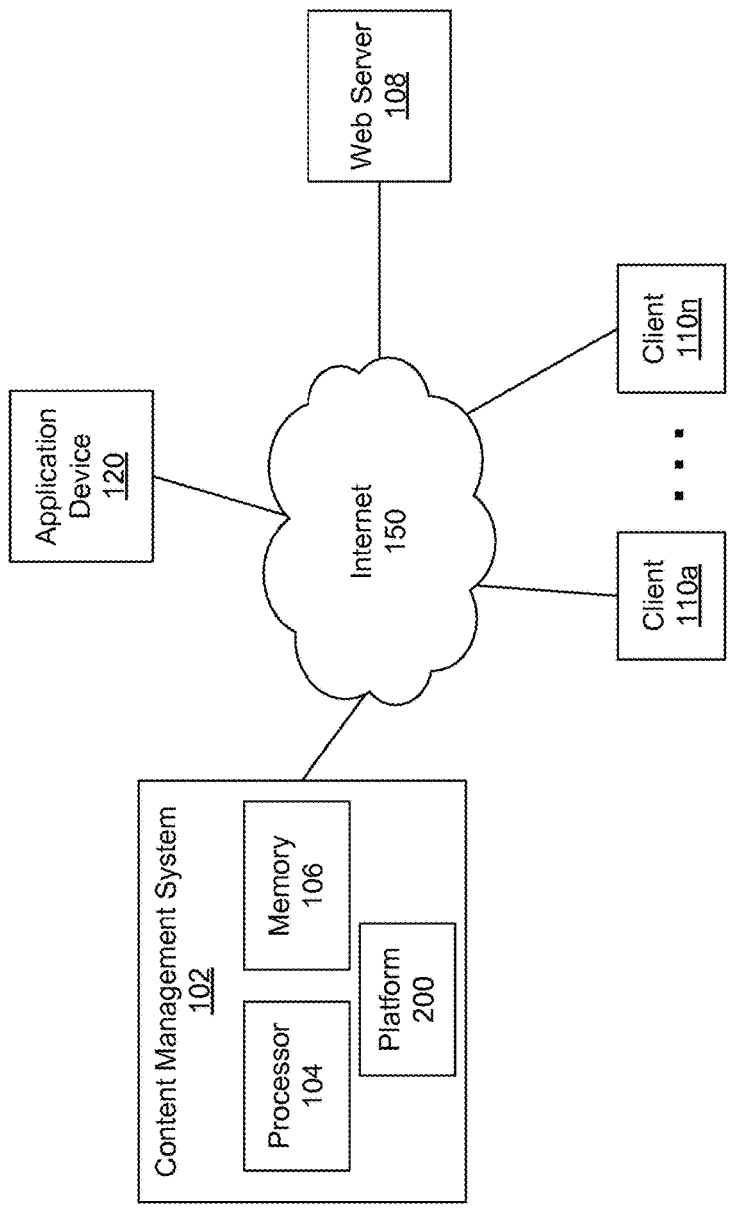
FIG. 1 depicts a block diagram of an exemplary system environment in which embodiments consistent with the present disclosure may be practiced and implemented.

FIG. 1 illustrates an exemplary system environment 100 in which embodiments consistent with the present disclosure may be practiced and implemented. As further disclosed herein, environment 100 of FIG. 1 may be used for providing live-streaming online content in web browsers or application devices.

As shown in FIG. 1, system environment 100 may include a content management system ("CMS") 102, a web server 108 for operating a website (hereinafter referred to as, but not limited to, "website 108"), a plurality of client devices ("clients") 110a-110n, and an application device 120. All of these components may be disposed in communication with one another via an electronic network, such as Internet 150 and/or other communication networks (not shown). Further, as will be appreciated from this disclosure, the number and orientation of these components may be modified, and system environment 100 may include one or more of the above-listed components.

CMS 102 may be configured to generate and manage live-streaming online content in an interactive platform 200 for display on website 108 or application device 120. Platform 200 may be available on website 108 or application device 120 for client 110 (i.e., one of clients 110a-110n, which may comprise desktop computers, laptops, mobile devices—including mobile phones and PDAs—or televisions) to view and interact with website 108 or application device 120.

Application device 120 may be any digital delivery system for displaying dynamic online content and streaming video to users. For example, one or more application devices 120 may be provided, including entertainment systems, such as Roku, TiVo, Xbox, Playstation, Sony Bravia, etc. Application devices 120 may also include mobile devices or tablets, such as the iPad, iPhone, or Android devices.

CMS 102 may include a processor 104 and a memory device 106 ("memory"). CMS 102 may store in memory 106 the content for display in platform 200. The items may include videos, pictures, user comments, social media posts, webpages, etc. CMS 102 may be configured to generate a series of video segments to stream in platform 200. Memory 106 may also store a set of programmable instructions that are executable by processor 104 to enable the operations of CMS 102, as disclosed herein. Additionally, memory 106 may be used for recording or otherwise storing information, such as video content, picture content, advertisement content, message content, user-generated content, webpage content, etc. The content may include metadata, stored in memory 106, for processor 104's use in programming and controlling the display of the content in platform 200.

Processor 104 may be configured to execute the set of programmable instructions in memory 106 and use the information stored in memory 106, where needed, to generate and provide the live-streaming content, in accordance with the embodiments disclosed herein. Processor 104 may also be configured to receive information from a user and generate further online content, in accordance with the embodiments disclosed herein. Processor 104 may also be configured to monitor the World Wide Web ("Web") for online content related to a particular video segment and generate the content for display in platform 200.

Figure 2:
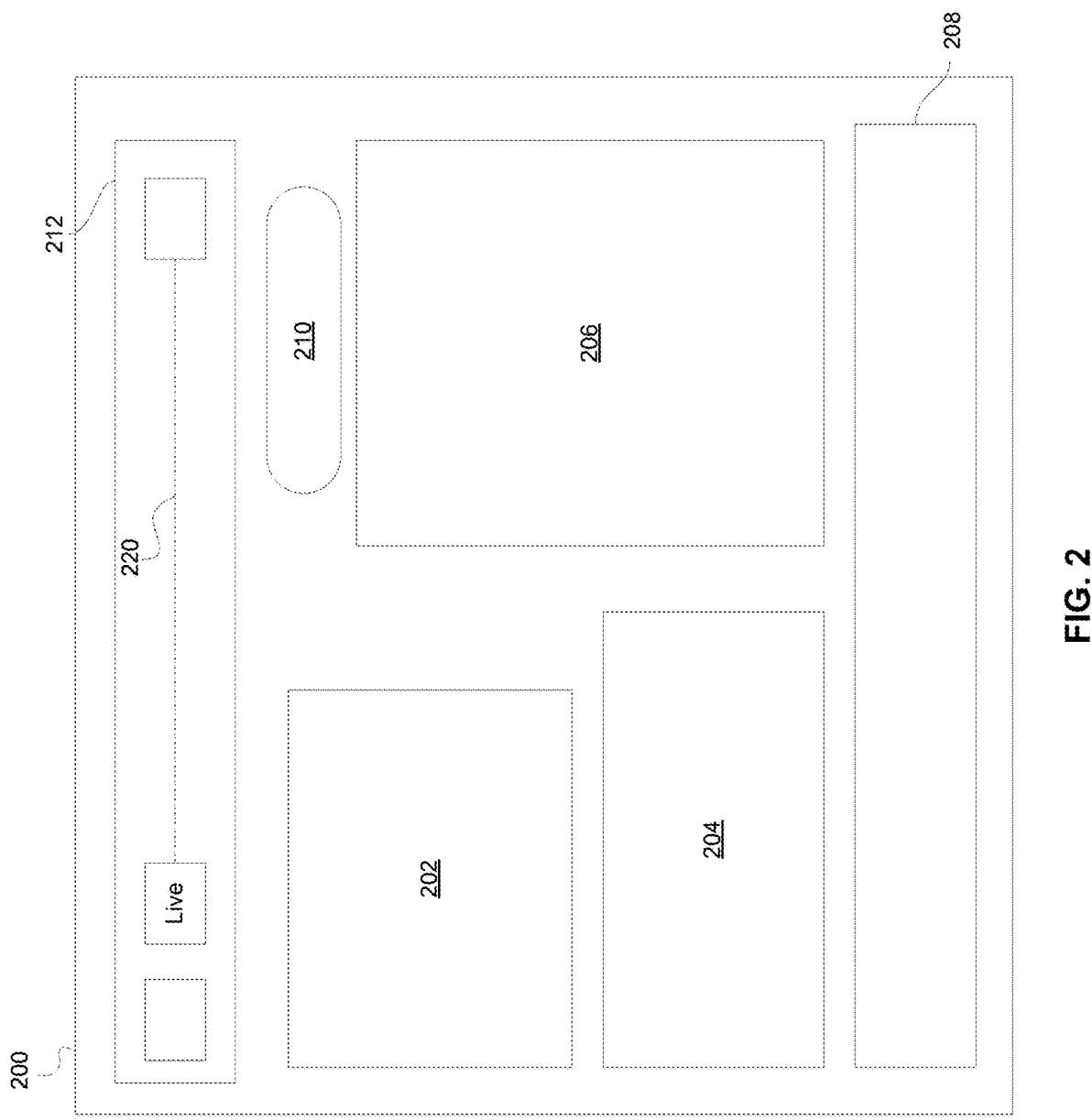
FIG. 2 depicts a block diagram of an exemplary platform for providing live-streaming content.

FIG. 2 illustrates an exemplary interactive platform 200 in which embodiments consistent with the present disclosure may be practiced and implemented. As further disclosed herein, platform 200 of FIG. 2 may be used for providing live-streaming online content on website 108 or application device 120. CMS 102 may be configured to generate and publish platform 200 to website 108 or application device 120. CMS 102 may publish and update content on platform 200 in real time. Platform 200 may contain various fields for displaying different online content, such as a video field 202, a navigation field 212, a resource field 204, a comments field 206, an archived field 208, etc., according to the embodiments described herein. CMS 102 may encode the online content with metadata, which allows CMS 102 to determine when to update the various fields. For example, CMS 102 may encode video segments with metadata that allows CMS 102 to track the start and end time of each video segment.

In one embodiment, video field 202 may be provided for displaying and playing a video in the series of videos (e.g., the "live" video). As used herein, "live" video may, but does not necessarily, constitute live coverage of an event as it happens concurrently in time. "Live" video may also include prerecorded video footage. CMS 102 may update video field 202 with a subsequent video in the series, which may then become the "live" video. A video subsequent to the live video may not be playable by client 110 until it becomes "live." When a video becomes "live," client 110 may play the video in video field 202 of, for example, website 108. After CMS 102 determines, via the metadata, that the "live" video has concluded, the concluded video may become a "previously live" video or an "archived" video. Client 110 may access a "previously live" video in the current series via navigation field 212 (described herein) using known video on-demand functionalities. In one embodiment, a video that is no longer "live" may be stored in memory 106 and displayed to user in another field 208 of the platform designated for "archived" videos.

CMS 102 may also provide comments field 206 for users viewing the live video to leave comments relating to the video. In one embodiment, CMS 102 may pull comments from another online content provider, such as AOL or Twitter, and display those comments in comments field 206. For example, CMS 102 may search the Web for Twitter comments relating to Huffington Post, by using known tagging functionalities, such as hashtags (e.g., #HuffPost). Client 110 viewing comments field 206 may review all online comments related to the "live" video in the same platform 200 where he may view the "live" video, without having to link out to another browser window or refresh the current window.

CMS 102 may also provide navigation field 212 for displaying icons 220, such as images representing the series of videos in the stream. One of icons 220 may indicate which video in the series is currently playing or playable (i.e., the label "Live" in FIG. 2). The stream may consist of a predetermined number of video segments. For example, CMS 102 may program 12-hour streams at a time and may separate the 12-hour streams into segments for each video. CMS 102 may code each segment with metadata in order to program the start and end of each video segment. Navigational field 212 may display every segment in the 12-hour stream. Other durations may be contemplated, such as 1-hour, 6-hour, or 24-hour streams. Client 110 may click, scroll, swipe, etc. to advance navigational field 212 through the segments. Client 110 may move forward (i.e., to see videos subsequent to the "live" video) or backward (i.e., to see previously live, or previously played, videos) in navigation field 212.

CMS 102 may also provide resource field 204 for displaying content related to the live video. CMS 102 may monitor the Web for information relating to the live video and may update resource field 204 in real time with relevant information. CMS 102 may also monitor the content of the live video in video field 202 and, in response, generate and display content in resource field 204 that is relevant to the live video feed. In one embodiment, CMS 102 may act as a fact-checker by monitoring comments made during an interview in the live video and determining whether facts discussed are correct. For example, if a commentator in the live video quotes the U.S. Constitution, CMS 102 may search the Web to confirm the accuracy of the quotation. CMS 102 may display in resource field 204 whether the quotation was accurate. In one embodiment, CMS 102 may display in resource field 204 a hyperlink to a webpage that CMS 102 sourced to fact-check the quotation. In another embodiment, CMS 102 may display a pop-up window for providing the relevant portion of the sourced webpage, or may inlay the relevant portions in resource field 204 itself.

CMS 102 may dynamically update the content in interactive platform 200 during the streaming broadcast of the live video in video field 202. CMS 102 may use websockets to push updates to platform 200 without requiring any polling. Other protocols or application programming interfaces that are well known in the art may be used, such as SockJS, XHR-Streaming, XHR-Polling, etc.

CMS 102 may update platform 200 when a video in the series becomes a "live" video. CMS 102 may push data to platform 200 to reflect that a new video has become live. The pushed data may update the various fields in platform 200, such as navigational field 212, comments field 206, resource field 204, etc. For example, the pushed data may cause navigational field 212 to reflect that a new one of icons 220 is the "live" video. The pushed data may also cause the new "live" video to appear in video field 202 for client 110 to watch. The pushed data may also cause resource field 204 and comments field 206 to reflect information related to the new "live" video.

Other updates may be contemplated. For example, CMS 102 may rearrange the order of the video segments in the series. In another embodiment, CMS 102 may insert a new video into the stream, such as a breaking news segment. In other embodiments, CMS 102 may update resource field 204 with new content as the live video plays, allowing a real time feed of relevant information to be populated in the field. In another embodiment, CMS 102 may update comments field 206 as the live video plays. During the broadcast of the live video, CMS 102 may receive new user comments and may update comments field 206 with the new comments in real time. Thus, client 110 may view the most recent comments relating to the live video without refreshing his browser window. The comments in comments field 206 may include textual strings, videos, images, and social media (e.g., "tweets").

CMS 102 may provide a tool 210 allowing a user to participate in a live video segment. In one embodiment, tool 210 may include a clickable button in interactive platform 200. For example, button 210 may read "Join Live Video." By clicking button 210, a user may request to be part of a future video stream. CMS 102 may receive the user's request and may prompt him for additional information. For example, CMS 102 may prompt the user to agree to various terms and/or conditions, such as terms governing the transfer of ownership of the user's content during the video he will participate in. CMS 102 may also prompt the user to submit content, such as a video, that CMS 102 may use to audition the user for a spot in an upcoming video. Screeners of CMS 102 (not shown), such as employees of the entity providing CMS 102, may review and authorize the user to be on an upcoming video. CMS 102 may then alert user by, for example, an e-mail message on client 110 that he can participate in an upcoming video. User may submit content, such as a video of himself, via client 110 to CMS 102 to be included in a live video. User may use any known video-capturing device, such as Skype, Google+ Hangouts, FaceTime, etc. to connect with CMS 102 during the live video. The live video may incorporate the user's video input during real time and may incorporate it into the live-streaming content. For example, if the live video involved two reporters, the user may interact in the live-streaming video with the reporters via, for example, Skype, on client 110a. Other clients 110b-110n viewing the live video in platform 200 could view the user's input in video field 202. CMS 102 may also allow client 110 to set alerts customized for client 110. For example, client 110 may set an alert for CMS 102 to send an e-mail notification whenever a subsequent video in the series becomes live. The e-mail may contain a hyperlink to the website 108 containing platform 200.

Figure 3:
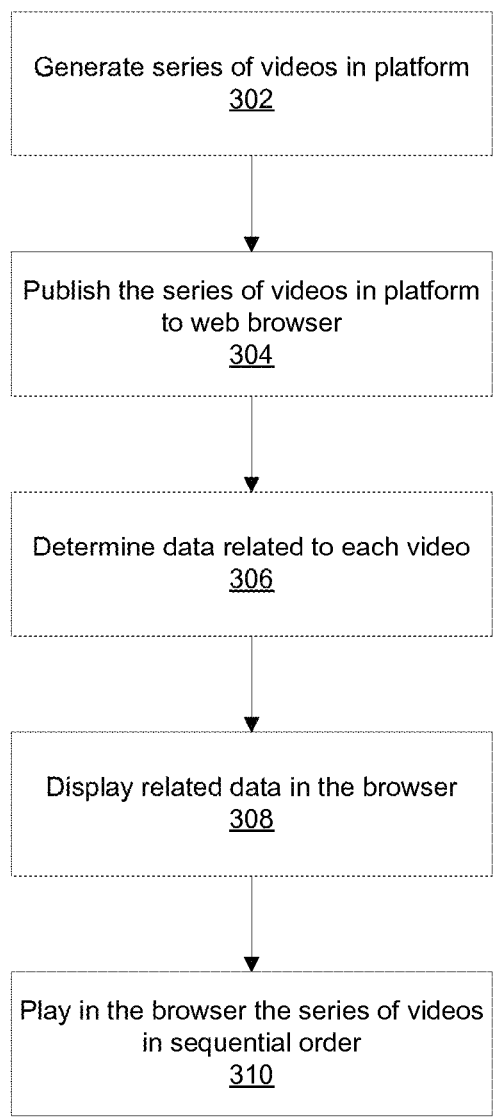
FIG. 3 depicts a flowchart of an exemplary method for providing live-streaming content in an interactive platform.

FIG. 3 depicts a flowchart of an exemplary method 300 for providing live-streaming online content in platform 200 of FIG. 2 using, for example, CMS 102 of FIG. 1. In step 302, CMS 102 may generate a series of videos in platform 200. In step 304, CMS 102 may publish the series of videos in platform 200 to a web browser in website 108 or application device 120 (FIG. 1). In step 306, CMS 102 may determine data that is related to each video in the series. For example, CMS 102 may search the Web for news articles, videos, pictures, blogs, user comments, social media feeds, etc. that are related to a video in the series. In step 308, CMS 102 may display the related data in the web browser. In one embodiment, CMS 102 may display the data in different fields. In other embodiments, CMS 102 may display the data as correlating to a particular video in the series of videos. In step 310, CMS 102 may play in the web browser the series of videos in a sequential order. For example, CMS 102 may generate a 12-hour stream of videos, and may program the videos in the stream to play sequentially. CMS 102 may control the start and end of each video via metadata, such that when a first video ends, a subsequent video begins. CMS 102 may thereby control when particular videos may be played in the web browser.

Figure 4:
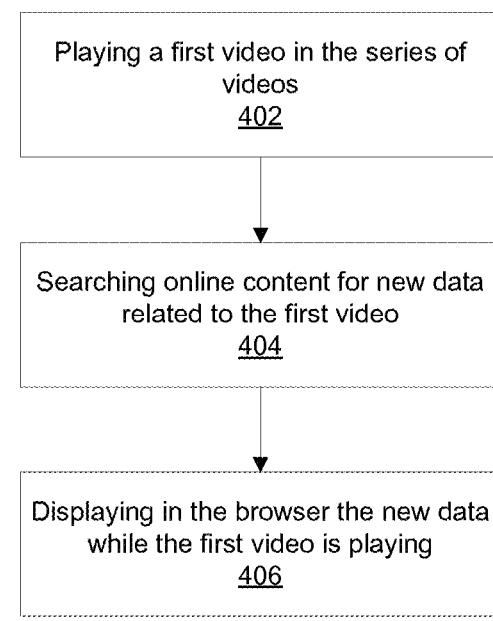
FIG. 4 depicts a flowchart of an exemplary method for updating resource content in an interactive platform.

FIG. 4 depicts a flowchart of an exemplary method 400 for updating the live-streaming online content in platform 200 of FIG. 2 using, for example, CMS 102 of FIG. 1. In step 402, CMS 102 may play a first video in the series of videos in the web browser of website 108 or application device 120. In step 404, CMS 102 may search the Web for new online content that relates to the first video. For example, while the first video is playing, CMS 102 may look for online content that may be related to the contents of the first video. In one embodiment, CMS 102 may fact-check the content of the first video, by searching for sources that may verify or disprove any comments or statements made in the first video. CMS 102 may discover relevant online content while the first video is currently being played. In step 406, CMS 102 may display in the web browser, which is playing the video, the new content while the video is ongoing.

Figure 5:
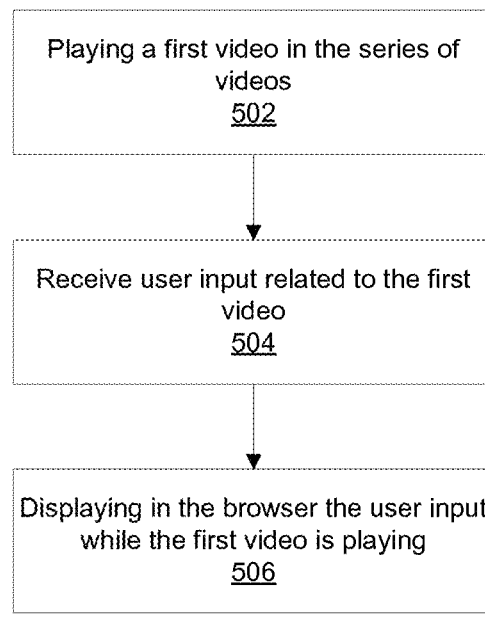
FIG. 5 depicts a flowchart of an exemplary method for updating user feedback in an interactive platform.

FIG. 5 depicts a flowchart of another exemplary method 500 for updating the live-streaming online content in platform 200 of FIG. 2 using, for example, CMS 102 of FIG. 1. In step 502, CMS 102 may play a first video in the series of videos in the web browser of website 108 or application device 120. In step 504, CMS 102 may receive new user input or feedback that relates to the first video. For example, while the first video is playing, users may generate new comments or social media feeds (e.g., "tweets") about the first video. CMS 102 may detect that new user input has been received that relates to the video currently being played. In step 506, CMS 102 may display in the web browser, which is playing the video, the new comments while the video is ongoing.

Figure 6:
FIG. 6 depicts a screenshot of an exemplary platform for providing live-streaming content.

FIG. 6 depicts a screenshot of an exemplary platform 200 for display in website 108 or application device 120, according to the disclosed embodiments. CMS 102 may generate and publish platform 200 to website 108 or application device 120, via the Internet 150, for access by client 110.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, systems and methods consistent with the disclosed embodiments may be implemented as a combination of hardware and software or in hardware alone. Examples of hardware include computing or processing systems, including personal computers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Programmable instructions, including computer programs, based on the written description and disclosed embodiments are within the skill of an experienced developer. The various programs or program modules can be created using any of the techniques known to one skilled in the art or can be designed in connection with existing software. For example, program sections or program modules can be designed in or by means of C#, Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

The following claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure.

What is claimed is:

1. A method for streaming online content to online devices, the method comprising:
   sending, by a system processor, a series of video segments to an online platform configured to display the series of video segments on at least one of a website and an application device, wherein the series of video segments i) are arranged in a sequential order, and ii) include a real time video segment that is to be broadcasted in real time and a prerecorded video segment;
   determining, by the system processor, that the real time video segment is being broadcasted;
   sending, by the system processor, instructions to the online platform for streaming the real time video segment on at least one of the website and the application device;
   prompting, by the system processor, a user to interact in real time with the real time video segment;
   retrieving from an external service, by the system processor, comments relating to the real time video segment using one or more tags linking the retrieved comments to the real time video segment;
   identifying, by the system processor, verifying content from one or more sources, wherein the verifying content either verifies or fails to verify subject matter of the real time video segment;
   sending, by the system processor, instructions to the online platform for displaying the verifying content, the retrieved comments, and user interaction; and
   displaying, by the system processor, the verifying content, the retrieved comments, and the user interaction with the real time video segment subject matter on at least one of the website and the application device during the real time broadcasting of the real time video segment.

2. The method of claim 1, wherein the verifying content includes at least one of user comments, social media comments, pictures, videos, webpages, and hyperlinks.

3. The method of claim 1, wherein identifying further includes identifying verifying content related to the subject matter of the prerecorded video.

4. The method of claim 1, further comprising:
   identifying, during the streaming of the real time video, the one or more sources for verifying content related to the real time video segment.

5. The method of claim 1, wherein the identifying occurs concurrently in time with the streaming of the real time video segment and the verifying content related to the real time video includes at least one of user comments, social media comments, pictures, videos, webpages, and hyperlinks.

6. The method of claim 1, further comprising:
   enabling, by the system processor, access to one or more supporting sources that provide the verifying content.

7. The method of claim 1, wherein the series of video segments are displayed via a browser in one of the website and the application device.

8. The method of claim 1, further comprising:
   receiving, by the system processor, an alert from the online platform indicating the real time video segment is no longer streaming and the prerecorded video segment may begin to play.

9. A system for streaming online content to online device, comprising:
a processor operating a content management system;
a memory storing instructions which, when executed by the processor operating the content management system, cause the system to:
send, by a system processor, a series of video segments to an online platform configured to display the series of video segments on at least one of a website and an application device, wherein the series of video segments i) are arranged in a sequential order, and ii) include a real time video segment that is to be broadcasted in real time and a prerecorded video segment;
determine, by the system processor, that the real time video segment is being broadcasted;
send, by the system processor, instructions to the online platform for streaming the real time video segment on at least one of the website and the application device;
prompt, by the system processor, a user to interact in real time with the real time video segment;
retrieve from an external service, by the system processor, comments relating to the real time video segment using one or more tags linking the retrieved comments to the real time video segment;
identify, by the system processor, verifying content from one or more sources, wherein the verifying content either verifies or fails to verify subject matter of the real time video segment;
send, by the system processor, instructions to the online platform for displaying the verifying content, the retrieved comments, and user interaction; and
display, by the system processor, the verifying content, the retrieved comments, and the user interaction with the real time video segment subject matter on at least one of the website and the application device during the real time broadcasting of the real time video segment.

10. The system of claim 9, wherein the verifying content includes at least one of user comments, social media comments, pictures, videos, webpages, and hyperlinks.

11. The system of claim 9, wherein identify further includes identifying verifying content related to the subject matter of the prerecorded video.

12. The system of claim 9, wherein the instructions further cause the system to:
identify, during the streaming of the real time video, the one or more sources for verifying content related to the real time video segment.

13. The system of claim 9, wherein the identifying occurs concurrently in time with the streaming of the real time video segment and the verifying content related to the real time video includes at least one of user comments, social media comments, pictures, videos, webpages, and hyperlinks.

14. The system of claim 9, wherein the instructions further cause the system to:
enable, by the system processor, access to one or more supporting sources that provide the verifying content.

15. The system of claim 9, wherein the series of video segments are displayed via a browser in one of the website and the application device.

16. The system of claim 9, wherein the instructions further cause the system to:
receive, by the system processor, an alert from the online platform indicating the real time video segment is no longer streaming and the prerecorded video segment may begin to play.

17. A non-transitory computer readable medium storing instructions for streaming online content to online devices, the instructions, when executed by a processor cause a computer to perform a method, the method including:
sending, by a system processor, a series of video segments to an online platform configured to display the series of video segments on at least one of a website and an application device, wherein the series of video segments i) are arranged in a sequential order, and ii) include a real time video segment that is to be broadcasted in real time and a prerecorded video segment;
determining, by the system processor, that the real time video segment is being broadcasted;
sending, by the system processor, instructions to the online platform for streaming the real time video segment on at least one of the website and the application device;
prompting, by the system processor, a user to interact in real time with the real time video segment;
retrieving from an external service, by the system processor, comments relating to the real time video segment using one or more tags linking the retrieved comments to the real time video segment;
identifying, by the system processor, verifying content from one or more sources, wherein the verifying content either verifies or fails to verify subject matter of the real time video segment;
sending, by the system processor, instructions to the online platform for displaying the verifying content, the retrieved comments, and user interaction; and
displaying, by the system processor, the verifying content, the retrieved comments, and the user interaction with the real time video segment subject matter on at least one of the website and the application device during the real time broadcasting of the real time video segment.

18. The non-transitory computer readable medium of claim 17, wherein the verifying content includes at least one of user comments, social media comments, pictures, videos, webpages, and hyperlinks.

19. The non-transitory computer readable medium of claim 17, wherein identifying further includes identifying verifying content related to the subject matter of the prerecorded video.

20. The non-transitory computer readable medium of claim 17, further comprising:
identifying, during the streaming of the real time video, the one or more sources for verifying content related to the real time video segment.

* * * * *